(12) United States Patent
Tanaka et al.

(10) Patent No.: US 8,223,454 B2
(45) Date of Patent: Jul. 17, 2012

(54) COOLING SYSTEM FOR AN ELECTRONIC UNIT WITH PLURAL HEAT-GENERATING SECTIONS

(75) Inventors: Kazuaki Tanaka, Yokohama (JP); Takeshi Hizono, Yokohama (JP); Hironori Oikawa, Hadano (JP)

(73) Assignee: Hitachi, Ltd., Tokyo (JP)

( * ) Notice: Subject to any disclaimer, the term of this patent is extended or adjusted under 35 U.S.C. 154(b) by 882 days.

(21) Appl. No.: 12/136,828

(22) Filed: Jun. 11, 2008

(65) Prior Publication Data

US 2009/0040654 A1 Feb. 12, 2009

(30) Foreign Application Priority Data

Jun. 13, 2007 (JP) ................................. 2007-156686

(51) Int. Cl.
*G11B 33/14* (2006.01)
(52) U.S. Cl. ..................................... 360/97.12; 720/649
(58) Field of Classification Search .... 360/97.02–97.04; 720/648–649
See application file for complete search history.

(56) References Cited

U.S. PATENT DOCUMENTS

| | | | |
|---|---|---|---|
| 5,510,954 A | | 4/1996 | Wyler |
| 6,452,790 B1 * | | 9/2002 | Chu et al. ................. 361/679.52 |
| 6,507,493 B2 * | | 1/2003 | Ueda et al. ..................... 361/704 |
| 6,885,556 B2 * | | 4/2005 | Kondo et al. ................. 361/699 |
| 7,675,748 B2 * | | 3/2010 | Matsushima et al. ..... 361/679.53 |
| 7,859,834 B2 * | | 12/2010 | Fukuda et al. ........... 361/679.46 |

FOREIGN PATENT DOCUMENTS

| | | |
|---|---|---|
| JP | 10-500792 | 1/1998 |
| JP | 2001-249736 | 9/2001 |
| JP | 2004-234777 | 8/2004 |
| JP | 2004-326906 | 11/2004 |
| JP | 2005-222585 | 8/2005 |
| JP | 2005-2225885 | 8/2005 |
| JP | 2005-285154 | 10/2005 |
| JP | 2006-127718 | 5/2006 |

OTHER PUBLICATIONS

Office Action issued in Japanese Patent Application No. 2007-156686 on May 11, 2010.

* cited by examiner

*Primary Examiner* — Allen Heinz
(74) *Attorney, Agent, or Firm* — Antonelli, Terry, Stout & Kraus, LLP.

(57) ABSTRACT

An electronic apparatus 1 in which is mounted an electronic unit having a plurality of heat-generating sections including at least a first heat-generating section and a second heat-generating section includes: a hold frame 9 for holding the electronic unit, a first heat-conducting member 11 for transmitting heat generated by the first heat-generating section, a second heat-conducting member 11 for transmitting heat generated by the second heat-generating section, and a cooling unit 8 for releasing the heat transmitted through the first and second heat-generating sections; in which apparatus, the first heat-conducting member 11 is heat-connected to the cooling unit 8, and the second heat-conducting member 11 is heat-connected to the cooling unit 8 via the hold frame 9.

9 Claims, 5 Drawing Sheets

COOLING SYSTEM FOR AN ELECTRONIC UNIT WITH PLURAL HEAT-GENERATING SECTIONS

FIELD OF THE INVENTION

The present invention relates to electronic apparatuses, more particularly, an electronic apparatus adapted to suppress a noise level of and heat emissions in a disk drive which transfers large volumes of information at high speed, and thereby to enhance performance of the disk drive.

BACKGROUND OF THE INVENTION

In recent years, the optical disk drives mounted in DVD (Digital Versatile Disk) recorders, and the hard-disk drives (HDDs) mounted in products such as personal computers and DVD recorders have been required to be able to transfer larger volumes of information at higher speeds in response to the variegation and diversification of information. These electronic apparatuses also tend to contain a plurality of disk drives in order to improve performance. Meanwhile, the electronic apparatuses in which optical disk drives and an HDD are to be mounted are desired to be downsized in response to the diversification of uses.

In disk drives, a spindle motor for driving a recording medium rotates at high speed to meet the above needs associated with the electronic apparatuses. The high-speed rotation, however, increases not only the heat stemming from the stator coil of the spindle motor, but also the amount of frictional heat occurring on the rotating shaft and bearings of the motor. In addition, the high-speed rotation further increases the noise arising from the disk rotation itself, and seek-associated noise. The increases in the amount of heat and in noise level reduce the performance of the disk drive. In addition, they are becoming a problem in terms of ambient environment.

In order to solve these problems, there are known techniques that allow heat to be released from a disk drive by ensuring an escape route for the heat to the outside of the disk drive while at the same time suppressing noise leakage to the disk drive exterior by maintaining airtightness of the drive under a mounted state thereof.

For example, JP-A-2006-127718 describes a technique that makes it possible, by insulating a disk drive with a vibration- and sound-absorbent, porous, and elastic member having heat-releasing holes formed therein, to release the heat that the disk drive has generated, from the heat-releasing holes formed in the porous elastic member.

Also, JP-A-2004-234777 describes a technique that allows noise from a hard-disk drive to be absorbed, and leakage of the noise to outside to be suppressed, by disposing a sound-absorbing material in a disk casing, installing the hard-disk drive in suspended form at the covering member of the disk casing, and forming an airtight space in the casing.

In addition, JP-A-2005-285154 describes a technique in which a disk casing is grooved on the outer surface thereof to increase a contact area with respect to outside air and thus to improve a heat-releasing effect.

Furthermore, in the technique described in JP-A-2005-222585, the seek noise level of a disk drive is reduced by including the disk drive in an outer enclosure with a foaming resin sheet attached thereto, and internally stored heat is released from the outer enclosure through an infrared-ray exchanging member heat-connected between the outer enclosure and the enclosure of the drive so as to be disposed to both enclosures.

Moreover, JP-A-2004-326906 describes bringing a disk drive into contact with the support unit of a heat-conductive plastic material to release heat from the disk drive through the heat-conductive plastic material.

The above conventional techniques, however, have the respective problems to be solved. For the technique described in JP-A-2006-127718, the number of heat-releasing holes lies in the relationship of the following trade-off: it is preferable that this number be larger for releasing a larger deal of heat, whereas it is preferable that the number be smaller for noise suppression.

For the technique described in JP-A-2004-234777, there is the problem that if the amount of heat generated by the hard-disk drive exceeds the amount of heat released from the covering member, increases in the temperature of the hard-disk drive cannot be sufficiently suppressed.

For the techniques described in JP-A-2005-285154 and JP-A-2005-222585, since the hard-disk drive is constructed to release heat through the external wall of the enclosure including the hard-disk drive, the amount of heat released depends on the surface area of the external wall and thus a problem occurs that is similar to that of the technique described in JP-A-2004-234777.

For the technique described in JP-A-2004-326906, since the support unit for releasing heat is constructed to include the entire hard-disk drive, it is unknown whether this heat-releasing construction is optimal for a case in which the internal heat-generating section of the hard-disk drive partly exists, or for a case in which a plurality of heat-generating sections are present.

SUMMARY OF THE INVENTION

An object of the present invention is to provide an electronic apparatus that effectively releases heat generated by an electronic unit such as a disk drive.

In order to achieve the above object, an aspect of the present invention is an electronic apparatus in which is mounted an electronic unit having a plurality of heat-generating sections including at least a first and a second heat-generating section; wherein the electronic apparatus comprises a hold frame for holding the electronic unit, a first heat-conducting member for transmitting heat generated by the first heat-generating section, a second heat-conducting member for transmitting heat generated by the second heat-generating section, and cooling unit for releasing the heat transmitted through the first and second heat-conducting members, and wherein the electronic apparatus can be constructed so that the first heat-conducting member is heat-connected to the cooling unit and so that the second heat-conducting member is heat-connected to the cooling unit via the hold frame.

In addition, the electronic unit is a hard-disk drive and can be constructed so that the first heat-generating section is a magnetic disk rotational driver that the hard-disk drive possesses, and so that the second heat-generating section is a circuit board with an electronic device mounted thereon to control the magnetic disk rotational driver that the hard-disk drive possesses.

Furthermore, the hold frame comprises a first hold frame that is heat-connected to the first heat-conducting member, and a second hold frame that is heat-connected to the second heat-conducting member, and can be constructed to hold the electronic unit in sandwiched form between the first hold frame and the second hold frame.

Another aspect of the present invention is an electronic apparatus in which is mounted an electronic unit having a plurality of heat-generating sections on opposed faces; wherein the electronic apparatus comprises a sound-proof casing that includes the electronic unit, a hold frame that is included in the sound-proof casing in order to hold the electronic unit, cooling unit that transfers heat generated by the electronic unit, to the outside of the sound-proof casing, a first heat-conducting member that is heat-connected to the heat-generating section on one face of the electronic unit in order to conduct generated heat into the cooling unit, and a second heat-conducting member that is heat-connected at one end thereof to the hold frame and at the other end to the heat-generating section on the other face of the electronic unit in order to conduct generated heat into the hold frame; wherein the cooling unit can be constructed to be heat-connected at one section thereof to the hold frame in order to transfer the heat generated by the heat-generating section and conducted via the first heat-conducting member and the second heat-conducting member, to the outside of the sound-proof casing.

In addition, the electronic unit is a hard-disk drive and can be constructed so that the first heat-conducting member is held in sandwiched form between a magnetic disk rotational driver of the hard-disk drive and the cooling unit, so that the second heat-conducting member is held in sandwiched form between a control circuit section of the hard-disk drive and the hold frame, and so that the cooling unit is held in sandwiched form between the first heat-conducting member and the hold frame.

According to the present invention, it is possible to provide an electronic apparatus that effectively releases the heat generated by a disk drive.

DESCRIPTION OF THE PREFERRED EMBODIMENTS

Figure 1:
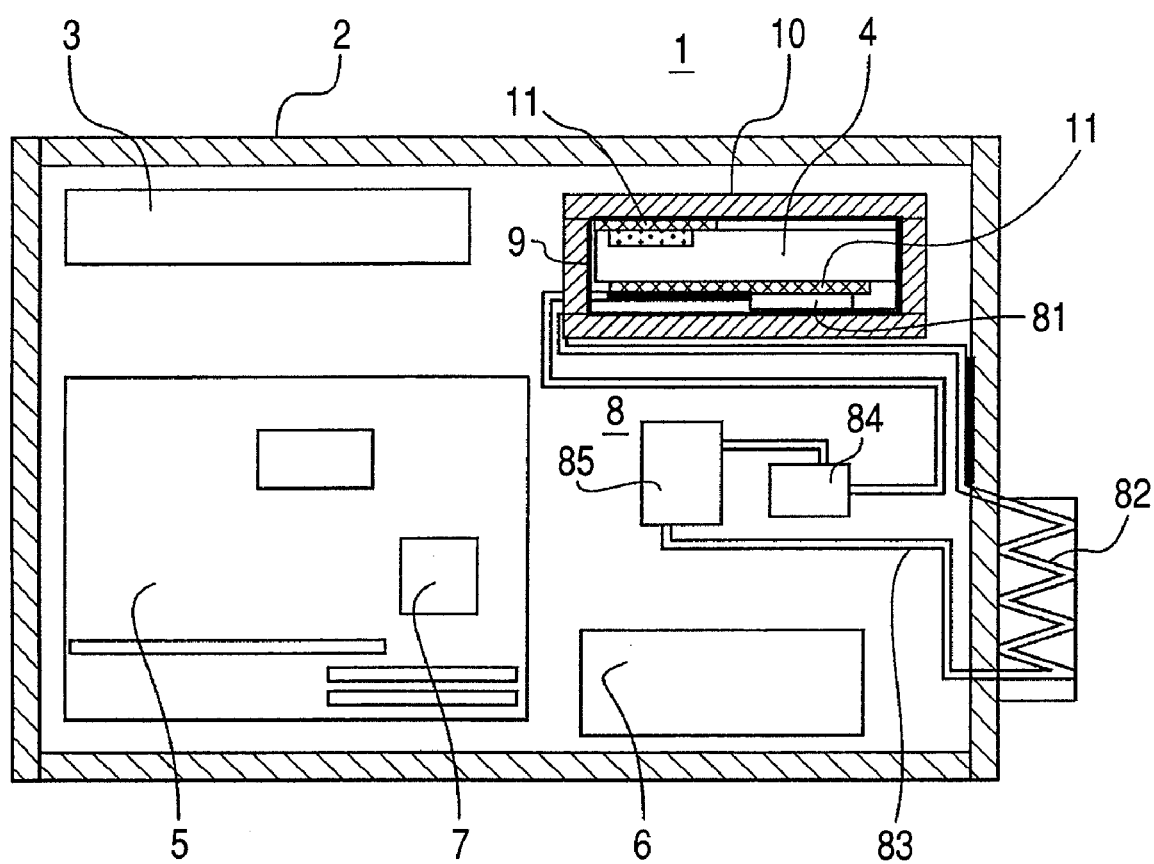
FIG. 1 is a diagram showing an example of an electronic apparatus configuration based on a first embodiment of the present invention.

Next, preferred embodiments of the present invention will be described hereunder referring to the accompanying drawings.
First Embodiment FIG. 1 is a diagram showing an example of an electronic apparatus configuration based on a first embodiment of the present invention. The electronic apparatus 1 in FIG. 1 includes an enclosure 2, an optical disk device 3, a hard-disk drive (HDD) 4, a circuit board 5, a power supply 6, a central processing unit (CPU) 7, a cooling unit 8, a hold frame 9, a hermetically sealed casing 10, and a heat-conducting member 11.

The enclosure 2 is a box that accommodates an electronic unit constituting the electronic apparatus 1. The optical disk device 3 uses laser light to conduct data read/write operations on an optical disk. The circuit board 5 has transistors and other elements mounted thereon to control the electronic apparatus 1. The power supply 6 drives the electronic apparatus 1. The CPU 7 executes device control, data calculation, and other functions. The heat-conducting member 11 is, for example, an acrylic heat-conductive sheet that transmits heat that the HDD 4 has generated. The hold frame 9 holds the HDD 4 and is heat-connected to the heat-conducting member 11. Since the hold frame 9 has a function that transmits heat from the HDD 4 to the cooling unit 8 (this function will be detailed later herein), the hold frame 9 is constructed of a highly heat-conductive aluminum material or the like. The hermetically sealed casing 10 is a box that accommodates the HDD 4 held in the hold frame. The cooling unit 8 cools the HDD 4 accommodated as a heat-generating element in the electronic apparatus 1.

Figure 3:
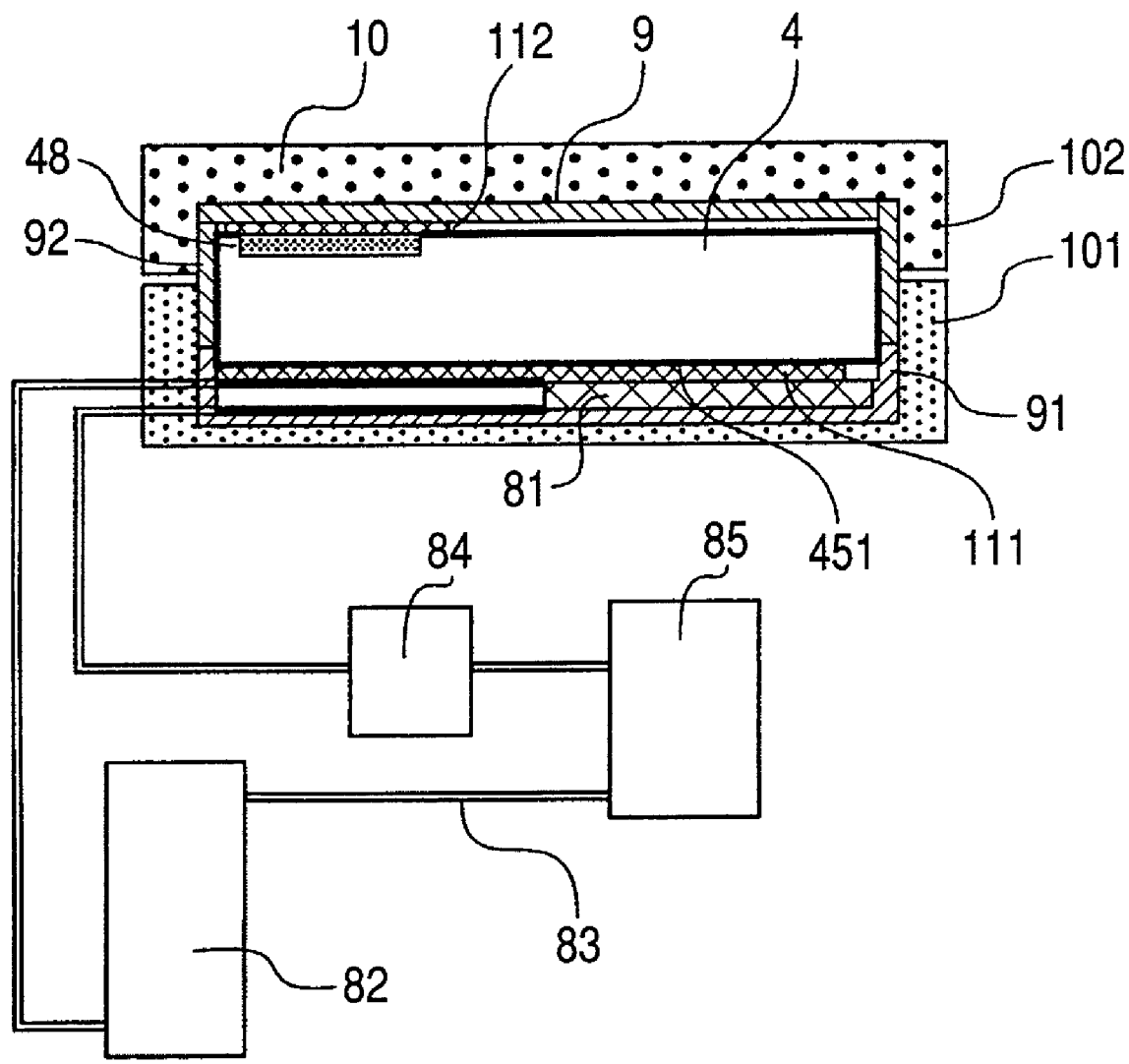
FIG. 3 is a diagram showing an example of a configuration including a hermetically sealed casing and a cooling unit.

FIG. 3 is a diagram showing an example of a configuration including the hermetically sealed casing 10 and the cooling unit 8. The hermetically sealed casing 10 includes a casing body 101 made of a soundproof material, and a casing cover 102. Also, the hermetically sealed casing 10 has the hold frame 9 therein. The hermetically sealed casing 10 has a hermetically sealed structure with minimum apertures, inclusive of an engagement structure between the casing body 101 and the casing cover 102. Thus, noise associated with rapid transfer of information which the HDD 4 reads and writes is occluded inside the casing 10 and does not leak to the outside thereof.

The cooling unit 8 includes a heat-receiving member 81, a pipeline 83, heat-releasing member 82, a pump 84, and a tank 85. The heat-receiving member 81 internally has a flow channel through which a refrigerant flows, and receives heat using this refrigerant. The heat-receiving member 81 is a horizontally long, flat-topped structure formed by, for example, press-working a highly heat-conductive, metallic, plate-shaped member into a linearly symmetric concave portion, then bonding this member and another press-worked similar plate-shaped member vertically together, and constructing the resulting concave space as a flow channel region for the refrigerant. The heat-releasing member 82 releases heat by heat exchange with outside air of the electronic apparatus 1. The pipeline 83 is provided for the refrigerant to circulate between the heat-receiving member 81 and the heat-releasing member 82, and transfers the refrigerant to the outside of the casing 10 after the heat-receiving member 81 has the heat-received refrigerant. The pump 84 drives the circulation of the refrigerant flowing through the pipeline 83. The tank 85 is used for storage of the refrigerant.

Figure 4:
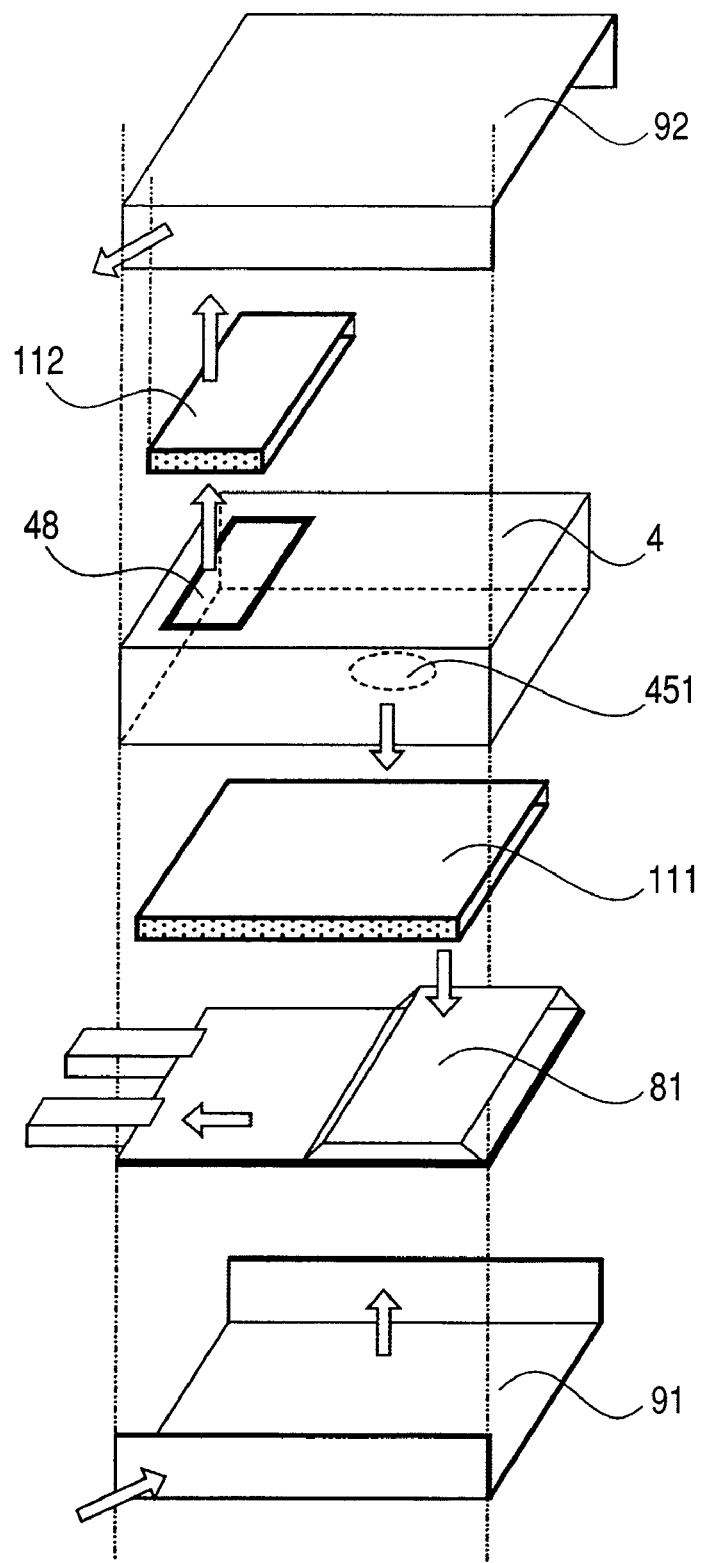
FIG. 4 is an exploded perspective view that shows constituent members formed to transfer generated heat from the HDD within a hold frame to the cooling unit.

FIG. 4 shows an exploded perspective view that shows constituent members formed to transfer generated heat from the HDD 4 within the hold frame 9 to the cooling unit 8. The HDD 4 is disposed in a layer-stacking direction with respect to the heat-receiving member 81 of the cooling unit 8. Also, the HDD 4 has a first heat-generating section 451 and a second heat-generating section 481, which are formed on opposed planes of a rectangular parallelepiped. A first heat-conducting member 111 and a second heat-conducting member 112 are therefore provided facing the first heat-generating section 451 and the second heat-generating section 481, respectively, of the HDD 4.

A plurality of circuit components each different in height are mounted on the HDD circuit board 84 that is a region of the second heat-generating section 481. In order to enhance a heat-connection state with respect to the circuit components, therefore, at least the second heat-conducting member 112 has a thickness of several millimeters, a surface area substantially equal to that of the circuit board, and sticky, flexible characteristics. When pressure is applied, the second heat-conducting member 112 utilizes the flexible characteristics and required thickness thereof to absorb the differences in height between the circuit components.

Since heat from a spindle motor 42 of the HDD 4 is transmitted to the first heat-generating section 451 of the HDD enclosure 45, the heat-receiving member 81 opposed to the first heat-conducting member 111 and having a horizontally long flat-topped shape with the flow channel for the refrigerant is heat-connected to the HDD 4 via the first heat-conducting member 111. The first heat-conducting member 111 is formed with an area so as to heat-connect the flow channel in the horizontally long and flat-topped heat-receiving member 81 over a length extending to the outside of the hermetically sealed casing 10. The first heat-conducting member 111 is further heat-connected to the first hold frame 91.

In order that the first heat-generating member 451 and second heat-generating member 481 in opposed planar sections of the HDD 4 are heat-connected to one cooling unit 8, the hold frame 9 is constituted by the first hold frame 91 and the second hold frame 92, and is constructed to hold the HDD 4 in sandwiched form under pressure by utilizing elasticity of the heat-conducting member 11.

Figure 2A:
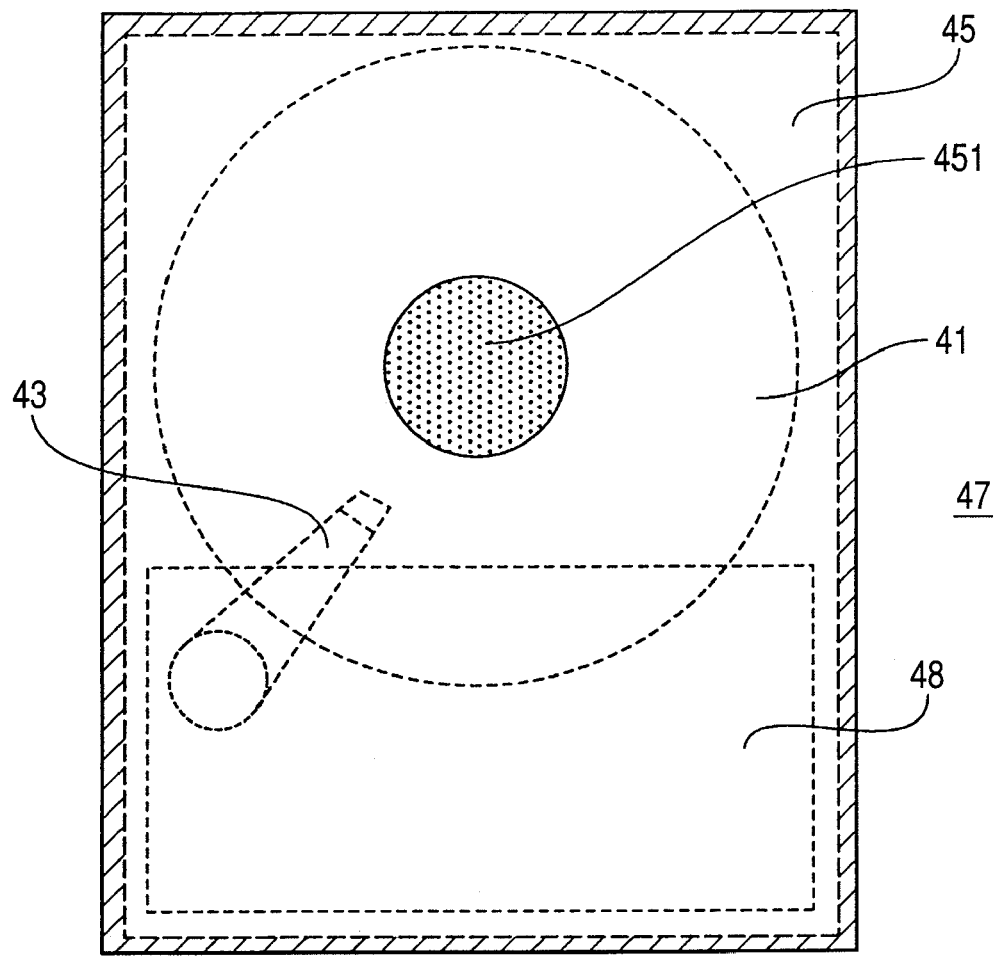
FIGS. 2A and 2B are diagrams showing an example of an HDD configuration.
Figure 2B:
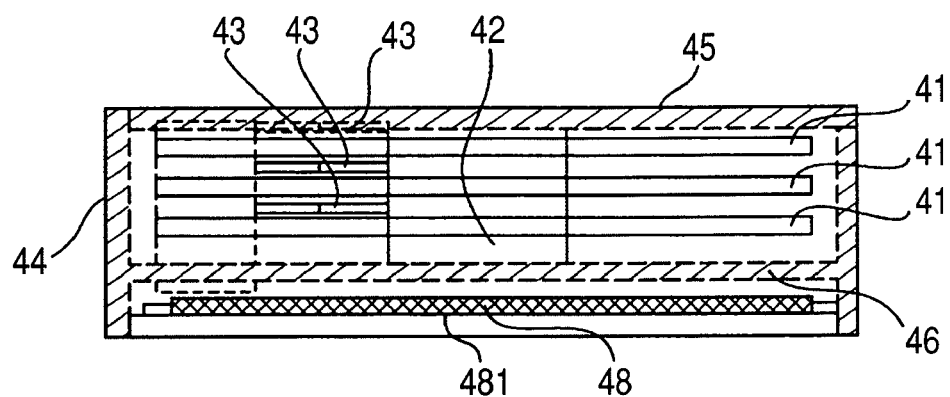

In order to ensure heat-connection between a heat-receiving member 41 and a bearing region that is the first heat-generating member 451, the HDD 4 rested in the hold frame 9 is constructed to be disposed on the heat-receiving member 41 rested in a lower section of the hold frame 9. That is to say, a relationship in vertical position between constituent elements of the HDD 4 shown in FIGS. 2A and 2B is reversed. In this way, the HDD 4 is disposed by utilizing an own weight thereof. The HDD 4 is a hard-disk reader.

FIGS. 2A and 2B show an example of a configuration of the HDD 4, 2A being a plan view thereof and 2B being a side view thereof. The HDD 4 in FIGS. 2A, 2B includes magnetic disks 41, a spindle motor 42, magnetic heads 43, an HDD side body 44, an HDD cover 45, an HDD bottom plate 46, an HDD enclosure 47, and an HDD circuit board 48. Each magnetic disk 41 is a memory medium made of a resin thin disk coated with a magnetic material. The spindle motor 42 is a motive power supply that rotates the magnetic disk 41. Each magnetic head 43 reads/writes magnetic data from/onto a magnetic recording layer formed on the surface of the magnetic disk 41. The HDD side body 44 is a component provided on a side of the HDD enclosure 47. The HDD enclosure 45 is a component provided at an upper section (equivalent to a function of a cover) of the HDD enclosure 47. The HDD bottom plate 46 is a component provided at a bottom section of the HDD enclosure 47. The HDD enclosure 47 is a box that accommodates the HDD 4. The HDD 4 needs to be protected from ingress of external dust in order to maintain reading and writing performance, so the HDD side body 44, the HDD enclosure 45, and the HDD bottom plate 46 form a hermetically sealed structure of a rectangular parallelepiped shape (the HDD side body 44 and the HDD cover 45 or the HDD bottom plate 46 may be integrally formed; the three sections as a whole are collectively termed the HDD enclosure 47).

The HDD circuit board 48, a board on which are mounted various elements such as transistors for driving control of the spindle motor 42 and the magnetic head 43, is mounted below the HDD enclosure 47.

Next, operation of the HDD 4 is described below. The HDD 4 has a plurality of magnetic disks 41 disposed in a layer-stacked condition and fixed to a rotating body of the spindle motor 42, and magnetically reads/writes data from/onto each magnetic disk 41 while rotating the disk 41 and conducting magnetization with the magnetic head 43.

Heat-generating sections of the HDD 4 are next described. The HDD 4 has two heat-generating sections, that is, a first heat-generating section 451 and a second heat-generating section 481. The first heat-generating section 451 is equivalent to a spindle motor hold region for holding the spindle motor 42, and the HDD cover 45 positioned above the spindle motor has the spindle motor hold region. The HDD 4 executes rapid data transfer by increasing a rotating speed of the magnetic disk 41, and high-speed rotation of the spindle motor 42 at this time increases stator coil and bearing heat. The generated stator coil and bearing heat is transmitted to the first heat-generating section 451 of the HDD enclosure 45 above the spindle motor 42. Since the HDD enclosure 47 is constructed of an aluminum material or the like to ensure reliability of the HDD 4 in terms of strength, the heat that has been transmitted to the first heat-generating section 451 is diffused over an entire region of the HDD enclosure 45 and then further diffused over an entire region of the HDD enclosure 47. The second heat-generating section 481 is equivalent to a region of the HDD circuit board 48 positioned below the HDD enclosure 47.

Meanwhile, the high-speed rotation of the spindle motor 42 increases a sliding sound of the bearing and a seek sound associated with information access by the head. To shut off this noise in the HDD 4, it is effective to rest the HDD 4 in the hermetically sealed casing 10, but to rest in this sealed space the HDD 4 having a plurality of heat-generating sections, there is a need to suppress the occurrence of heat in the HDD 4 or to conduct optimal cooling of the HDD 4.

Next, the cooling operation of the HDD 4 will be described below taking as an example a heat transmission route formed to cool down the heat of the first heat-generating section 451 and second heat-generating section 481 of the HDD 4.

As indicated by a white-on-black arrow in FIG. 4, heat from the first heat-generating section 451 of the HDD 4 is transmitted to the first heat-transmitting member 111 and then transmitted along the heat transmission route to the refrigerant in the heat-receiving member 81 of the cooling unit 8. Heat from the second heat-generating section 481 of the HDD 4 is transmitted to the second heat-conducting member 112 and then transmitted to the second hold frame 92. This heat is further transmitted to the first hold frame 91 bonded to the second hold frame 92, and transmitted along the heat transmission route to the refrigerant in the heat-receiving member 81 of the cooling unit 8. That is to say, the hold frame 9 constituted by the hold frames 91 and 92 functions as a heat transmitter/conductor. After the heat from the first heat-generating section 451 and second heat-generating section 481 of the HDD 4 has been absorbed by the refrigerant flowing through the heat-receiving member 81, the refrigerant-circulating pump 84 disposed midway on the circulation channel of the refrigerant drives the heat-releasing member 82 disposed to protrude over an outer edge of the enclosure 2. Thus, the heat-releasing member 82 transmits and releases the heat of the refrigerant to the atmosphere.

In the above description of FIG. 4, the first heat-generating section 451 of the HDD 4 is set forth as the spindle motor 42 of the HDD 4, and the second heat-generating section 481, as the HDD circuit board 48. However, this configuration does not limit the present invention, and an installing direction of the HDD 4 may be reversed to make the spindle motor 42 of the HDD 4 function as the second heat-generating section 481, and the HDD circuit board 48 function as the first heat-generating section 451. Either of the above two configurations can be determined according to the amount of heat arising from the heat-generating section and a particular temperature of the heat-generating section.

As described above, the first embodiment employs the configuration with the HDD 4 confined in the hermetically sealed casing 10 to reduce noise, and with the heat-generating section of the HDD 4 adapted to receive heat via the heat-conducting member 11 by use of a refrigerant and transfer the received heat to the outside of the casing 10 to effectively release the heat therefrom.

In addition, the configuration depending on the heat-generating section makes heat effectively releasable, even from a heat-generating body having a plurality of heat-generating sections.

Furthermore, the horizontally long flat-topped structure of the heat-receiving member 81 can be further reduced in thickness, even if a layer-stacked structure becomes necessary. Miniaturization of the electronic apparatus 1 becomes possible as a result.

Second Embodiment

Figure 5:
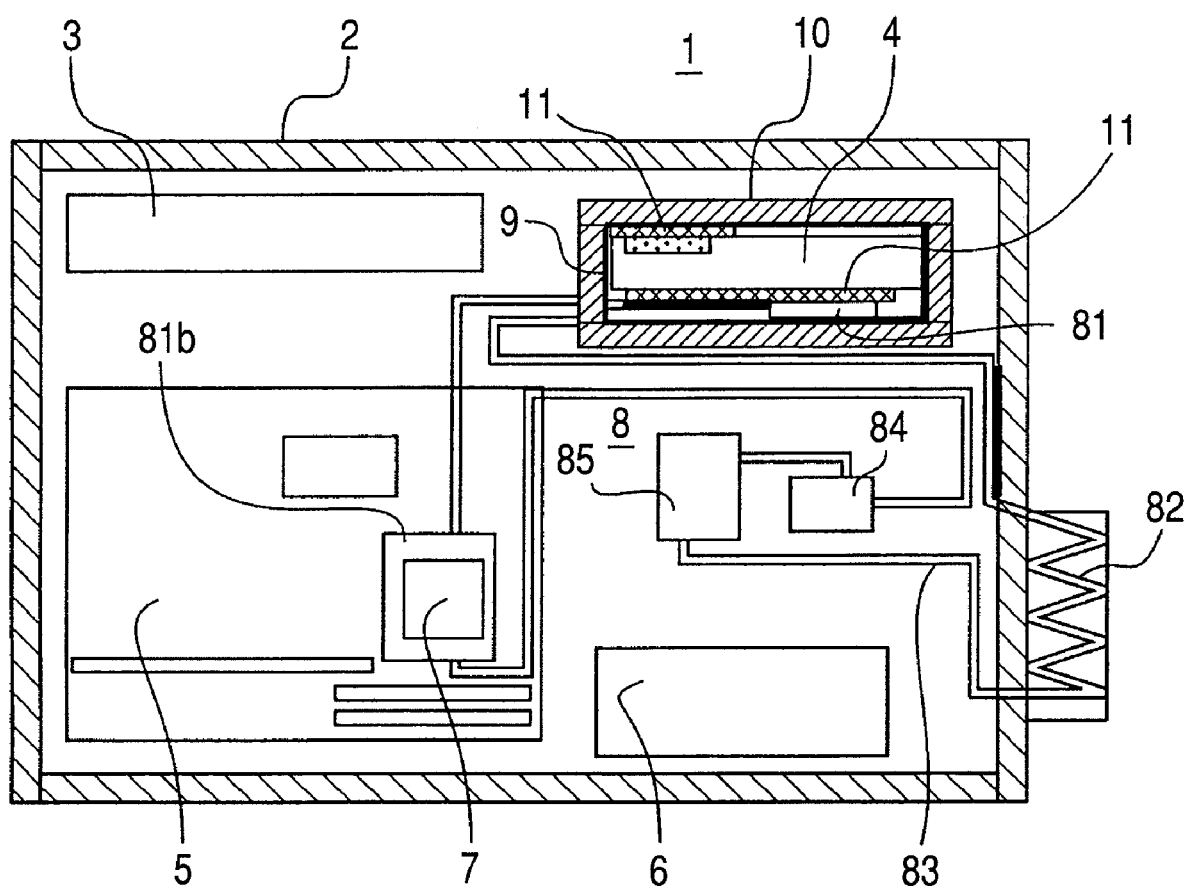
FIG. 5 is a diagram showing an example of an electronic apparatus configuration based on a second embodiment of the present invention.

FIG. 5 is a diagram showing an example of a configuration based on a second embodiment of the present invention.

While the HDD 4 is the only heat-generating body mounted in the electronic apparatus 1 of the first embodiment, another heat-generating body is mounted in a CPU of the second embodiment. A heat-receiving member 81b, as with the heat-receiving member 81, has a flow channel through which a refrigerant circulates, and uses the refrigerant to receive heat of the CPU. The heat-receiving member 81b is connected to a middle portion of the refrigerant circulation channel in a cooling unit 8. In the present embodiment, the heat-generating bodies arranged at a plurality of remote positions can be easily cooled by providing an appropriate refrigerant flow rate and heat-releasing member 82 beforehand according to the amount of heat generated by the heat-generating body.

For mounting of additional HDDs 4 in the electronic apparatus 1, the plurality of heat-generating bodies can be cooled by arranging the HDDs 4 in stacked or parallel fashion in the electronic apparatus 1 and connecting heat-receiving members 81 to the refrigerant circulation channel in the cooling unit 8. Each HDD 4 in that case is included in a hermetically sealed casing 10, as in the first embodiment.

The present invention is not limited to the embodiments disclosed in detail above, and can be modified or changed in various forms without departing from the spirit or scope of the appended claims.

What is claimed is:

1. An electronic apparatus in which is mounted an electronic unit having at least two heat-generating sections on opposed faces, the apparatus comprising:
   a sealed casing that has a hermetically sealed structure and includes a casing body;
   a hold frame that is included in the sealed casing in order to hold the electronic unit;
   cooling unit that transfers heat generated by the electronic unit, to the outside of the sealed casing;
   a first heat-conducting member that is heat-connected to a first heat-generating section on the electronic unit in order to conduct generated heat into the cooling unit; and
   a second heat-conducting member that is heat-connected to the hold frame and to a second heat-generating section on the electronic unit in order to conduct generated heat into the hold frame;
   wherein the cooling unit is heat-connected at the hold frame in order to transfer the heat generated by the second heat-generating section and conducted via the first heat-conducting member and the second heat-conducting member, to the outside of the sealed casing.

2. The electronic apparatus according to claim 1, wherein:
   the electronic unit is a hard-disk drive;
   the first heat-conducting member is held in sandwiched form between a magnetic disk rotational driver of the hard-disk drive and the cooling unit;
   the second heat-conducting member is held in sandwiched form between a control circuit section of the hard-disk drive and the hold frame; and
   the cooling unit is held in sandwiched form between the first heat-conducting member and the hold frame.

3. The electronic apparatus according to claim 2, wherein:
   the second heat-conducting member has a surface area substantially covering the control section and sticky, flexible characteristics.

4. The electronic apparatus according to claim 3, wherein:
   the second heat-conducting member utilizes flexible characteristics and required thickness thereof to absorb differences in height between circuit components in the control section.

5. The electronic apparatus according to claim 1, wherein:
   the first heat-conducting member and the second heat-conducting member are flat.

6. The electronic apparatus according to claim 1, wherein:
   the hold frame includes a first hold frame that is heat-connected to the first heat-conducting member, and a second hold frame that is heat-connected to the second heat-conducting member; and
   the hold frame holds the electronic unit in sandwiched form between the first hold frame and the second hold frame.

7. The electronic apparatus according to claim 1, wherein:
   the cooling unit includes at least a heat-receiving member internally having a flow channel for flowing a refrigerant therein to receive heat transmitted by the first heat-conducting member;
   a heat-releasing member for releasing heat by heat exchange with outside air of the electronic apparatus; and
   a pipeline providing for the refrigerant to circulate between the heat-receiving member and the heat-releasing member.

8. The electronic apparatus according to claim 7, wherein:
   the first heat-conducting member is formed with an area so as to heat-connect the flow channel in the horizontally long and flat-topped said heat-receiving member over a length extending to the outside of the hermetically sealed casing.

9. An electronic apparatus in which is mounted an electronic unit having at least two heat-generating sections on opposed faces, the apparatus comprising:
   a sealed casing that has a hermetically sealed structure and includes a casing body;
   a hold frame that is included in the sealed casing in order to hold the electronic unit;
   cooling unit that transfers heat generated by the electronic unit, to the outside of the sealed casing;
   a first heat-conducting member that is heat-connected to a first heat-generating section on the electronic unit in order to conduct generated heat into the cooling unit; and
   a second heat-conducting member that is heat-connected to the hold frame and to a second heat-generating section on the electronic unit in order to conduct generated heat into the hold frame;
   wherein the cooling unit is heat-connected at the hold frame in order to transfer the heat generated by the second heat-generating section and conducted via the first heat-conducting member and the second heat-conducting member, to the outside of the sealed casing;
wherein:
the cooling unit includes at least a heat-receiving member internally having a flow channel for flowing a refrigerant therein to receive heat transmitted by the first heat-conducting member;
a heat-releasing member for releasing heat by heat exchange with outside air of the electronic apparatus; and
a pipeline providing for the refrigerant to circulate between the heat-receiving member and the heat-releasing member, wherein:
the first heat-conducting member is formed with an area so as to heat-connect the flow channel in the horizontally long and flat-topped said heat-receiving member over a length extending to the outside of the hermetically sealed casing.

* * * * *